United States Patent [19]

Kojima et al.

[11] 4,412,160
[45] Oct. 25, 1983

[54] DC MOTOR DRIVING APPARATUS

[75] Inventors: Akira Kojima, Toki; Toshiyasu Sakai, Kariya, both of Japan

[73] Assignee: Nippondenso Co., Ltd., Kariya, Japan

[21] Appl. No.: 311,401

[22] Filed: Oct. 14, 1981

[30] Foreign Application Priority Data

Oct. 16, 1980 [JP] Japan .................. 55/144627

[51] Int. Cl.³ .......................... H02K 23/66
[52] U.S. Cl. .................. 318/280; 318/345 A; 361/23; 363/54
[58] Field of Search ............... 318/280, 345 K, 345 C, 318/345 D, 345 G, 762, 294, 295, 291, 331; 361/23, 100; 363/54, 128, 129

[56] References Cited

U.S. PATENT DOCUMENTS 4,150,325 4/1979 Miller et al. .................. 363/54

Primary Examiner—J. V. Truhe
Assistant Examiner—A. Evans
Attorney, Agent, or Firm—Cushman, Darby & Cushman

[57] ABSTRACT

A dc motor driving apparatus comprising a full-wave rectifier bridge circuit for supplying dc power to a dc motor and a dc motor driving control circuit for controlling the turning on and off of thyristors forming the full-wave rectifier bridge circuit, further comprises a protecting control circuit operatively associated with the dc motor driving control circuit for preventing the occurrence of a short-circuit mode in the full-wave rectifier bridge circuit caused by a malfunction of the thyristors and ensuring highly efficient, quick responsive and stable control of the reversing, braking, stopping and other speed changing operations of the dc motor.

2 Claims, 6 Drawing Figures

DC MOTOR DRIVING APPARATUS

BACKGROUND OF THE INVENTION

1. Field of the Invention

The present invention relates to a circuit system designed to prevent (the occurrence of a short-circuit mode in a dc motor driving apparatus employing a full-wave rectifier bridge system for converting ac power) from an ac voltage supply to dc power so as to efficiently control the reversing, braking, stopping and other speed changing operations of a dc motor.

2. Description of the Prior Art

Many of known supply voltage ac-to-dc converter circuits for controlling the rotational speed of dc motors employ a half-wave rectifier bridge system which causes no short-circuit mode, so that a part of the upper half or the lower half of an ac waveform is utilized to effect phase control of the speed of a dc motor. There has been another special system of increasing the frequency of a power supply to ensure a stable motor speed, but this system has not been used positively because of the complexity of the circuitry involved. Still other known systems include transistor bridge systems, etc.

In a single-phase half-wave rectifier bridge system, there is a greater variation in the level of the dc voltage across the motor than in the full-wave rectifier bridge system, although no short-circuit mode is caused in the single-phase half-wave rectifier bridge system. As a result, if the dc motor is braked by plugging to control the motor speed or the motor is controlled to operate stably at a low speed, this causes disadvantages of the irregular rotation, the generation of a buzzing noise, etc. These problems can be overcome by means of the full-wave rectifier bridge system. More specifically, in the half-wave rectifier bridge system, each of the thyristors is triggered only once during each cycle of the power supply waveform, whereas, in the full-wave rectifier bridge system each of the thyristors is triggered twice during each cycle with the result that not only such troubles as the irregular rotation, the generation of a buzzing noise, etc., can be prevented but also the controllability of the reversing, braking, stopping and other speeds of the motor can be improved. However, the full-wave rectifier bridge system has not been used positively because of its disadvantage that if any of the thyristors fires erroneously when a dc motor is reversed in rotation, braked or its speed is changed, the short-circuit mode will be established and thus the thyristors will be damaged.

The present invention has been made with a view to overcoming the deficiencies of the above-described ac-to-dc conversion full-wave rectifier bridge system for dc motor driving power supply circuits.

SUMMARY OF THE INVENTION

It is an object of the present invention to provide a dc motor driving apparatus, which positively utilizes a full-wave rectifier bridge system for efficiently controlling the reversing, braking and stopping operations and the speed change of a dc motor, by employing an improved controlled rectifier element driving system for avoiding the occurrence of a short-circuit mode.

DESCRIPTION OF THE PREFERRED EMBODIMENTS

Preferred embodiments of the present invention will now be described with reference to the accompanying drawings.

Figure 1:
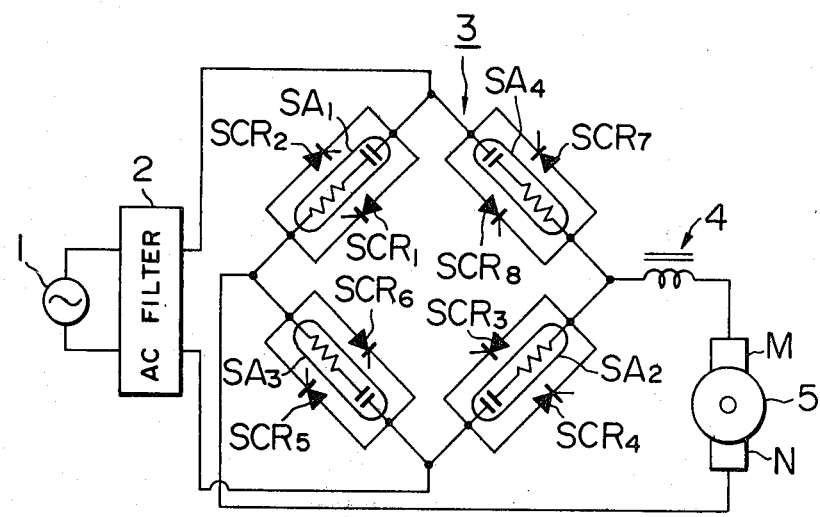
FIG. 1 is a general view of a dc motor driving control circuit employing a thyristor full-wave rectifier bridge system.

Referring first to FIG. 1, the control of a direct current supplied to the motor and the mode of a short-circuit which may be possible in a dc motor driving circuit employing the full-wave rectifier bridge system, will be described with reference to FIG. 1.

In the Figure, reference numeral 1 designates an ac power supply, 2 an ac filter, and 3 a thyristor full-wave rectifier bridge circuit whose respective arms include inverse-parallel connections of the respective thyristor pairs $SCR_1$ and $SCR_2$; $SCR_3$ and $SCR_4$; $SCR_5$ and $SCR_6$; and $SCR_7$ and $SCR_8$, and surge absorbing circuits $SA_1$, $SA_2$, $SA_3$ and $SA_4$ which are respectively connected in parallel with the respective thyristor pairs. Numeral 4 designates a dc smoothing reactor. Numeral 5 designates a dc motor, and symbols M and N disignate motor terminals.

Figure 3:
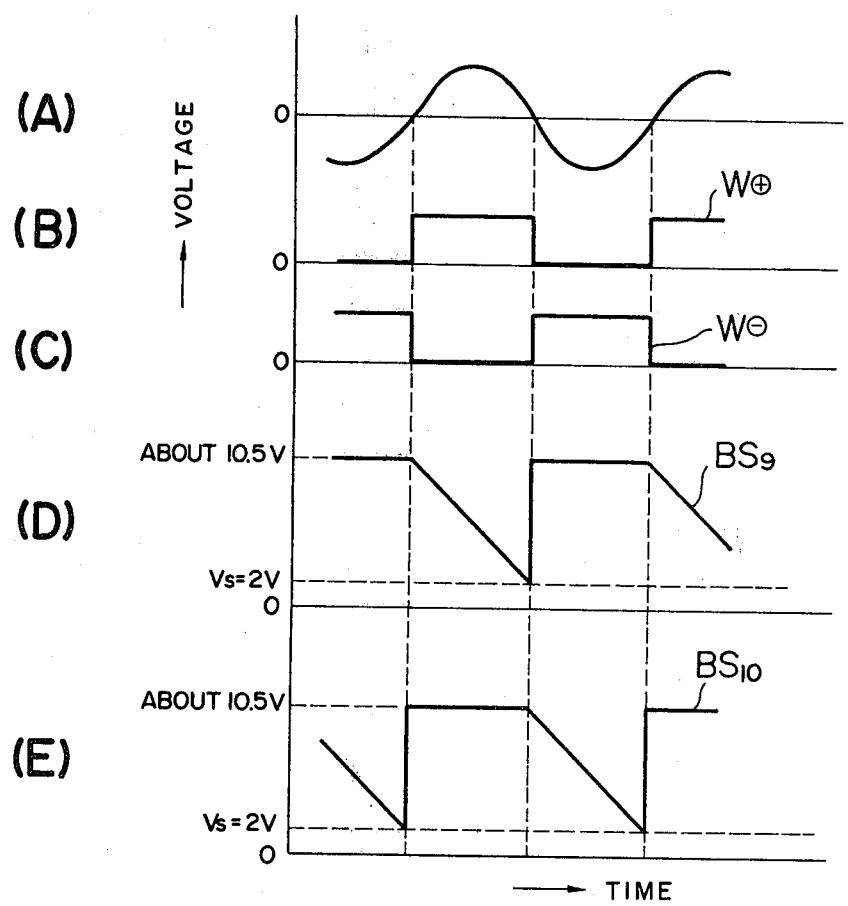
FIG. 3 shows the waveforms generated in the circuitry of the dc motor driving apparatus shown in FIG. 2, with (A) showing the waveform of the ac supply voltage, (B) and (C) the output signal waveforms of the zero-crossing detecting circuit in the circuitry of FIG. 2, and (D) and (E) the output signal waveforms of the two bootstap circuits in the circuitry of FIG. 2.

In accordance with the dc motor driving control mode employing the thyristor full-wave rectifier bridge system, the determination of a combination of thyristors to be turned on is effected in dependence on the combination of conditions, i.e., whether the polarity of the output voltage waveform of the ac power supply 1 is positive (hereinafter a signal indicative of the positive half cycle is designated by a symbol W⊕ as shown in (B) of FIG. 3) or negative (hereinafter a signal indicative of the negative half cycle is designated by a symbol W⊖ as shown in (C) of FIG. 3) and whether the direction of rotation of the dc motor is a forward direction (hereinafter a forward rotation control signal is designated by a symbol F) or a backward direction (hereinafter a backward rotation control signal is designated by a symbol B).

The following table shows the combinations of the thyristors which are to be turned on in the respective cases. In the table, the polarities of the dc motor terminals M and N in the respective cases are also shown.

| Polarity of ac supply voltage | Rotational direction of dc motor | Combination of thyristors to be turned on | | Polarities of dc motors terminals |
|---|---|---|---|---|
| W⊕ | F | SCR$_8$ ↕ | SCR$_6$ ↕ | M+, N− |
|  | B | SCR$_3$ | SCR$_1$ | M−, N+ |
| W⊖ | F | SCR$_4$ ↕ | SCR$_2$ ↕ | M+, N− |
|  | B | SCR$_7$ | SCR$_5$ | M−, N+ |

In the above table, the thyristor pairs with the vertical both-ends arrows ↕ indicate that the short-circuit mode will be caused by a malfunction of SCR$_3$ or SCR$_1$ in the case of W⊕ and F; by a malfunction of SCR$_8$ or SCR$_6$ in the case of W⊕ and B; by a malfunction of SCR$_7$ or SCR$_5$ in the case of W⊖ and F; and by a malfunction of SCR$_4$ or SCR$_2$ in the case of W⊖ and B, thereby causing damages to the thyristors in any one of these cases.

As a result, in order to prevent the occurrence of a short-circuit mode, it is necessary that, if the forward rotation control signal F is commanded in the respective cases of W⊕ and W⊖, the combination of the thyristors for the backward rotation control signal B of the same phase involving the danger of causing a short-circuit mode during the half cycle of the ac power supply at that time is inhibited, and, if the backward rotation control signal B is commanded, the combination of the thyristors for the signal F of the same phase is inhibited during the half cycle of the ac power supply at that time, thus preventing the occurrence of a short-circuit mode.

Next, the overall circuit construction of the dc motor driving apparatus according to the invention will be described with reference to FIG. 2.

In the Figure, electric power from an ac power supply 1 is applied through an ac filter 2 to a thyristor full-wave rectifier bridge circuit 3 and dc power is supplied to a dc motor 5. The thyristor full-wave rectifier bridge circuit 3 comprises a bridge connection of eight thyristors as shown in FIG. 1 and the thyristors are triggered by a known type of driving unit which is called as a phase shifter but not shown here.

Numeral 17 designates a dc motor driving control circuit comprising a transformer 7, a zero-crossing detector circuit 8, two bootstrap circuits 9 and 10 and a thyristor driver circuit 11. As shown in FIG. 2, the zero-crossing detector circuit 8 is designed so that an output signal W⊕ of a high level as shown in (B) of FIG. 3 is delivered from one of its output terminals to the bootstrap circuit 9 during the positive half cycle of the ac power supply 1 and an output signal W⊖ of a high level as shown in (C) of FIG. 3 is delivered from the other of its output terminals to the bootstrap circuit 10 during the negative half cycle of the ac power supply 1. The bootstrap circuits 9 and 10 generate sawtooth wave output signals BS$_9$ and BS$_{10}$ shown in (D) and (E) of FIG. 3, respectively. In the present embodiment, as shown in FIG. 3, the minimum level V$_s$ of the output signals BS$_9$ and BS$_{10}$ is selected to be 2 volts and their maximum level is selected to be about 10.5 volts.

Figure 4:
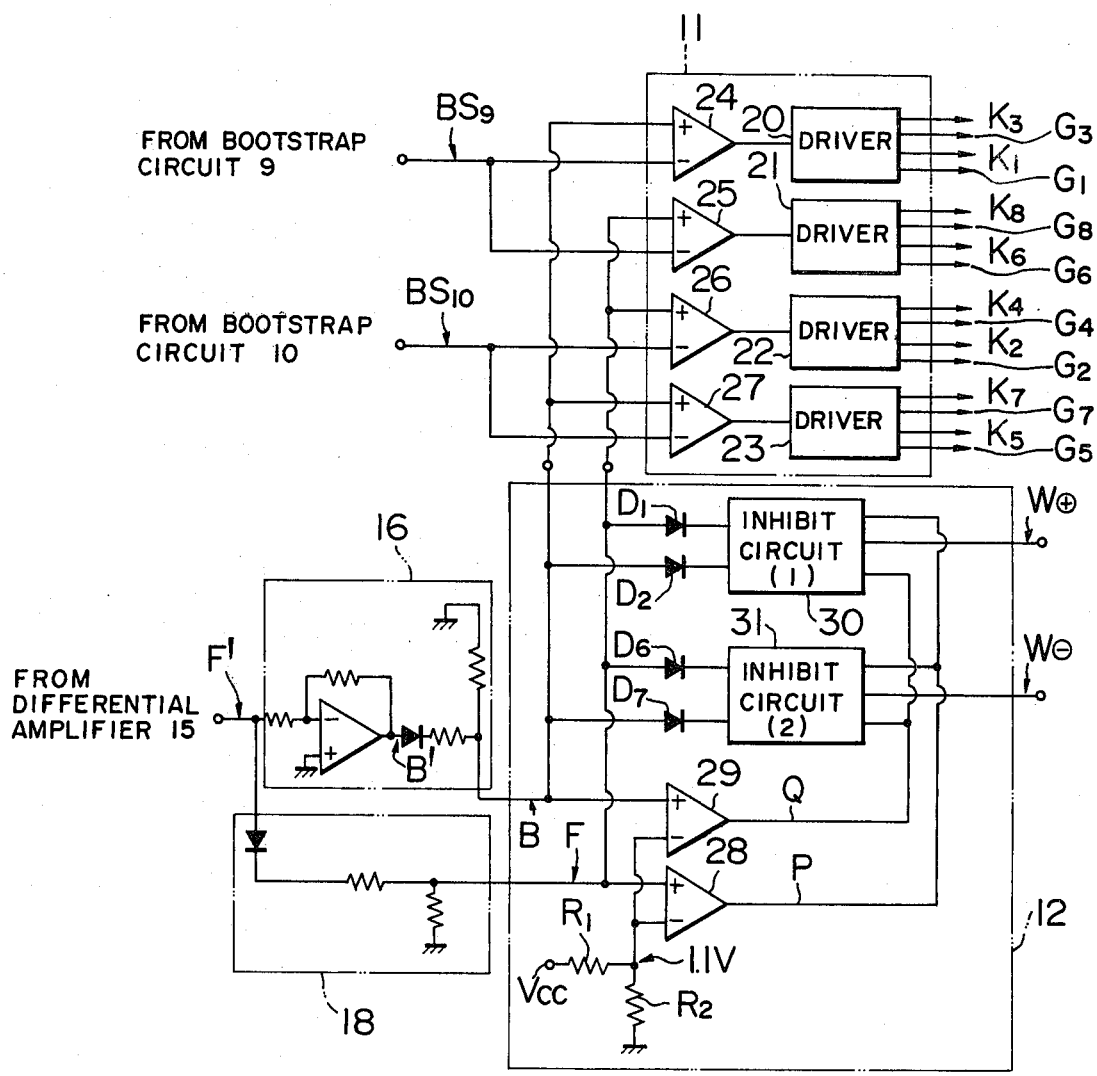
FIG. 4 is a schematic block diagram showing the manner in which the combination of the thyristor driver circuits and the protecting control circuit added by the invention are interconnected in the circuitry of the dc motor driving apparatus shown in FIG. 2.

FIG. 4 shows the construction and the interconnections of the thyristor driver circuit 11 and a protecting control circuit 12 to be combined therewith according to the invention. As shown in FIG. 4, the thyristor driver circuit 11 comprises four comparators 24, 25, 26 and 27 and the driver circuits 20, 21, 22 and 23 responsive to the respective outputs of the comparators 24 to 27 to drive the commanded thyristors. Symbols G and K showing the destinations of the output lead wires from each of the driver circuits 20, 21, 22 and 23 denote respectively gates and cathodes of the thyristors to be driven thereby. As shown in FIG. 4, each of the comparators 24, 25, 26 and 27 receives either of the two output signals BS$_9$ and BS$_{10}$ from the respective bootstrap circuits 9 and 10 and either of two command signals F and B for determining firing angles to effect the motor speed control.

Figure 2:
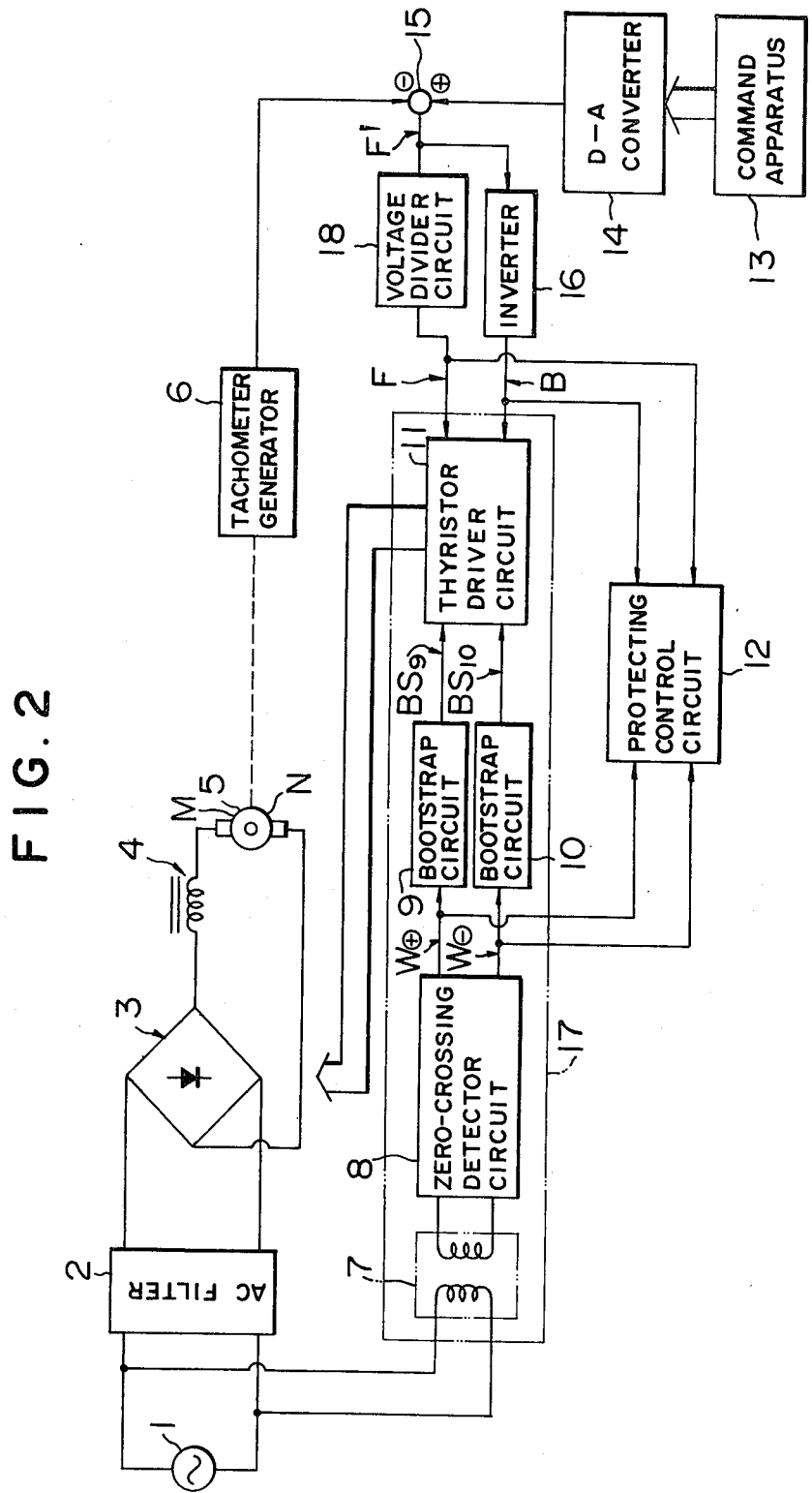
FIG. 2 is a block diagram showing the overall circuit construction of a dc motor driving apparatus according to this invention which incorporates a protecting control circuit according to the invention in the construction of a prior art dc motor driving apparatus employing a full-wave rectifier bridge system.

Further, as shown in FIG. 2, there are provided, for the purpose of the motor speed control, a command apparatus 13, a D-A converter 14, a comparator or differential amplifier 15, an inverter 16 and a tachometer generator 6, whereby a motor speed command signal generated by the command apparatus 13 is converted into an analog voltage by the D-A converter 14. The differential amplifier 15 generates at its output a voltage signal F' corresponding to the difference between the analog voltage and the tachometer generator output voltage indicative of the actual motor speed, and the voltage divider circuit 18 generates at its output a signal F whose voltage is a division of the voltage signal F'. The inverter 16 inverts the sign of the signal F' and divides its output voltage thereby to generate a voltage signal B. The signal F and the signal B are applied respectively as a signal for controlling the forward rotation speed of the dc motor 5 and a signal for controlling the backward rotation speed of the dc motor 5 to the thyristor driver circuit 11 and the protecting control circuit 12. The values of the command signals F and B become about 5 to 6 volts during a high speed operation of the dc motor 5 and the approach the minimum level V$_s$ (2 volts in the case of this embodiment) of the signals BS$_9$ and BS$_{10}$ as the speed of the dc motor 5 decreases.

The thyristor driver circuit 11 receives the sawtooth wave voltage signals BS$_9$ and BS$_{10}$ from the bootstrap circuits 9 and 10 and the voltage signals F and B so that the desired thyristor firing angle which provides the commanded motor speed is determined in synchronism with each half cycle of the alternating voltage from the ac power supply 1.

While the dc motor driving control circuit 17 for the thyristor full-wave rectifier bridge circuit 3 has a construction such as described above in conjunction with FIG. 2 and operates as mentioned above, with the above-described construction as such, it is impossible to surely obviate the deficiency that a short-circuit mode may be caused by any thyristor malfunction. With a view to overcoming this deficiency, as shown in FIG. 2 and also shown in greater detail in FIG. 4, the protecting control circuit 12 according to this invention is used in combination with the thyristor driver circuit 11 in the dc motor driving control circuit 17.

The protecting control circuit 12 according to the invention will now be described with reference to FIGS. 4 and 5.

Figure 5:
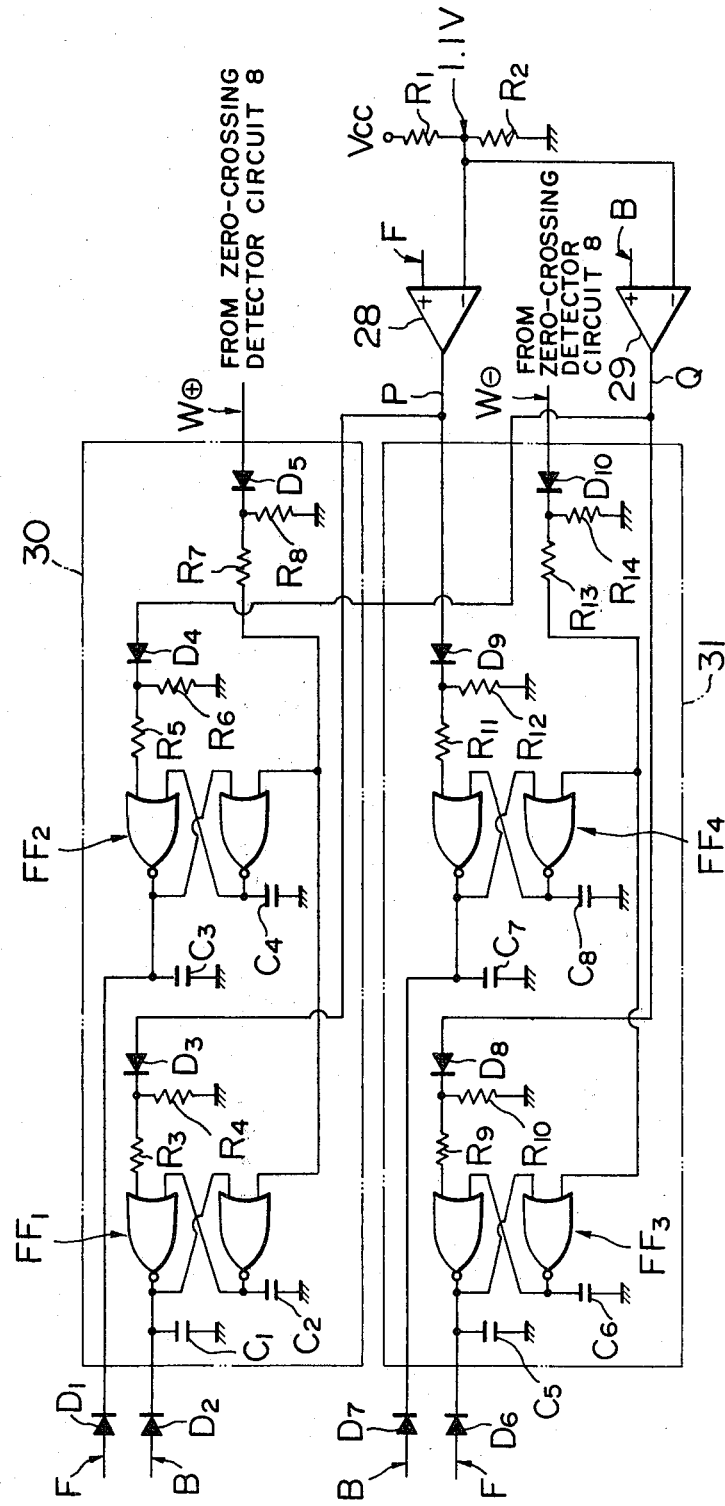
FIG. 5 shows by way of example a detailed circuit construction of the protecting control circuit according to the invention.

As shown in FIG. 4, the protecting control circuit 12 comprises two comparators 28 and 29 each thereof receiving at its inverting terminal a reference voltage of 1.1 volts, for example, inhibit circuits (1) and (2) whose detailed constructions are shown by way of example in FIG. 5 and input diodes $D_1$, $D_2$ and $D_2$, $D_6$ for the inhibit circuits (1) and (2), respectively. The comparators 28 and 29 are designed so that, when the control signals F and B assume positive values greater than 1.1 volts, for example, high level output signals are generated at their output terminals P and Q.

Referring to FIG. 5 showing in detail an exemplifying circuit construction of the protecting control circuit 12 according to the invention, the inhibit circuits (1) and (2) respectively comprise circuits 30 and 31 including RS flip-flops $FF_1$ and $FF_2$; and $FF_3$ and $FF_4$; respectively, each of which flip-flops employs a pair of NOR gate circuits. When the output signal $W\oplus$ of the zero-crossing detector circuit 8 takes a high level (namely, during the positive half cycle of the ac power supply voltage), the inhibit circuit (1) or 30 becomes operative so that, if at this time the forward rotation speed control signal F from the differential amplifier 15 becomes positive and exceeds the reference voltage of 1.1 volts causing the signal appearing at the output terminal P of the comparator 28 to take a high level, the level of the output terminal of the flip-flop $FF_1$ becomes low to give a forward bias to the diode $D_2$, thereby holding the circuit of the backward rotation speed control signal B at a level of about 0.8 volt which is lower than the minimum level $V_s$ (2 volts in the case of this embodiment as mentioned previously) of the input signal $BS_9$ applied to the thyristor driver circuit 11 from the bootstrap circuit 9. Consequently, the output of the comparator 24 takes a low level so that the driver circuit 20 does not trigger the thyristors $SCR_3$ and $SCR_1$ and keep them nonconductive while the output signal $W\oplus$ of the zero-crossing detector circuit 8 remains at the high level. Thereafter, as the level of the forward rotation speed control signal F rises exceeding the minimum level $V_s$ and crosses the ramp waveform of the input signal $BS_9$, the output level of the comparator 25 takes a high level so that the driver circuit 21 triggers the $SCR_8$ and $SCR_6$ to turn conductive and thereby to energize the dc motor 5. However, the $SCR_3$ and $SCR_1$ are maintained in the nonconductive state as mentioned previously and the occurrence of a short-circuit mode is prevented.

On the other hand, when the output signal $W\oplus$ of the zero-crossing detector circuit 8 takes a high level, if the backward rotation speed control signal B becomes positive and exceeds the reference voltage 1.1 volts of the comparator 29 causing the signal appearing at its output terminal Q to take a high level, the level of the output terminal of the flip-flop $FF_2$ becomes low to give a forward bias to the diode $D_1$, thereby holding the circuit of the forward rotation speed control signal F at a level of about 0.8 volt which is lower than the minimum level $V_s$ (2 volts in the case of this embodiment as mentioned previously) of the input signal $BS_9$ to the thyristor driver circuit 11. As a result, the output of the comparator 25 takes a low level so that the driver circuit 21 is not energized and the $SCR_8$ and $SCR_6$ are kept nonconductive while the output signal $W\oplus$ remains at the high level. Thereafter, as the level of the backward rotation speed control signal B rises exceeding the minimum voltage value $V_s$ and crosses the ramp waveform of the input signal $BS_9$, the comparator 24 energizes the driver circuit 20 which in turn triggers the $SCR_3$ and $SCR_1$ to turn conductive and thereby to energize the dc motor 5. In this case, the occurrence of a short-circuit mode is also prevented since the $SCR_8$ and $SCR_6$ are kept nonconductive while the output signal $W\ominus$ of the zero-crossing detector circuit 8 remains at the high level as mentioned previously.

The inhibit circuit (2) or 31 performs the similar short-circuit mode preventing action as described above when the output signal $W\ominus$ of the zero-crossing detector circuit 8 is at the high level (i.e., during the negative half cycle of the ac power supply voltage).

Figure 6:
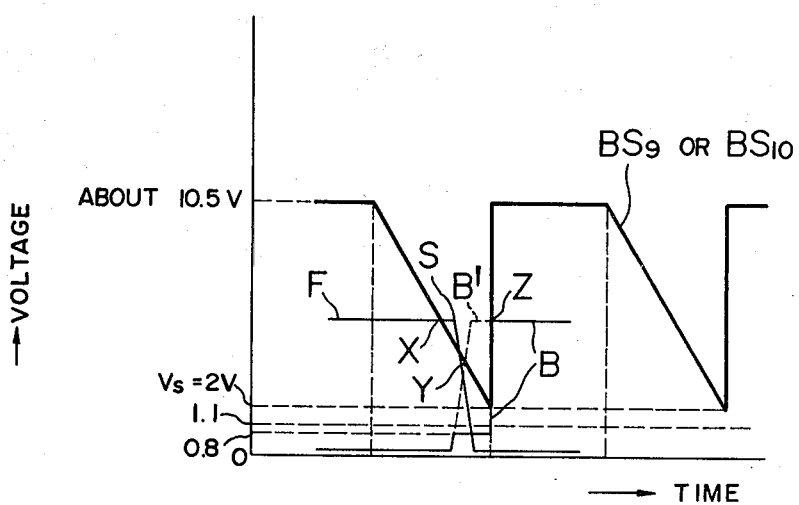
FIG. 6 is a diagram useful for explaining the operation of the protecting control circuit when the rotation of the dc motor is reversed.

Next, the operation and effect of the protecting control circuit 12 will now be described with respect to an exemplifying case where a backward rotation command signal from the command apparatus 13 is applied to the D-A converter 14, while the motor 5 is rotating in the forward direction, in reference to FIG. 6. In the Figure, the sawtooth waveform corresponds to $BS_{10}$ or $BS_9$ depending on whether the output signal $W\oplus$ or $W\ominus$ is at a high level when the backward rotation command for the dc motor 5 is applied at the time point S in the Figure. When the backward rotation command is applied at the time point S, the waveform of the forward rotation speed control signal F falls and the waveform of the backward rotation speed control signal B rises. Since the level of the waveform F between the time points X and S is higher than the reference voltage of 1.1 volts for the comparator 28, the level of the output terminal P of the comparator 28 becomes high and either the inhibit circuit (1) or the inhibit circuit (2) comes into operation depending on whether the output signal $W\oplus$ or the output signal $W\ominus$ is at the high level. Thus, the level of the signal B is held at about 0.8 volt as shown by the waveform indicated with a solid line so that any action based thereon is inhibited. It is at the time point Z that the level of the signal B rises and the inhibition of an action to be caused by the signal B ceases. However, since the thyristors triggered in response to the signal F at the time point X have already been turned off by the time point Z, there is no possibility of the occurrence of a short-circuit mode.

If the protecting control circuit 12 according to the invention were not used here, after the time point S the signal B would rise following the waveform B' which would be produced by the inverter 16 to have an inverted waveform of the signal F. This would give rise to a defect of causing a short-circuit mode between the combination of the thyristors triggered at the time point X in response to the signal F and the combination of the thyristors triggered at the time point Y in response to the signal B. The respective thyristors triggered at the time points X and Y would, however, be turned off before and at the time point Z.

By virtue of the operation described above, the protecting control circuit 12 of this invention operates in conjunction with the thyristor driver circuit 11 to effect protecting control for preventing the occurrence of a short-circuit mode in the thyristor full-wave rectifier bridge circuit of the dc motor driving apparatus.

The constructions of the inhibit circuits in the protecting control circuit of this invention are not limited to those of the circuits 30 and 31 shown in FIG. 5, but any other constructions may be used so far as a required short-circuit mode inhibit logic is ensured therein. Further, it is possible to utilize the output signals of the inhibit circuits 30 and 31 to hold the output level of the desired one of the comparators 24 to 27 at a low level so that the operation of the required one of the driver circuits 20 to 23 is inhibited.

Further, where there is a danger of the thyristors being triggered to cause malfunction by the noise superposed on the applied power supply voltage, a noise filter may be inserted in the gate circuit of each thyristor so as to prevent a thyristor misfiring mode from being caused by the dv/dt effect of the noise.

While, in the above-described embodiment of the invention, thyristors are used as the controlled rectifier elements in the full-wave rectifier bridge circuit, it is possible to apply the present invention to the cases where power controlled rectifier elements including gate-turnoff controlled rectifier elements, etc. are used.

Experiments conducted with a thyristor full-wave rectifier bridge circuit of a dc motor driving apparatus employing the protecting control circuit according to the invention showed that no short-circuit mode appeared in the switching operation between the forward rotation and the backward rotation of a dc motor when it was operated from a 60 Hz ac power supply.

It will thus be seen from the foregoing description that the use of the protecting control circuit according to the invention has an advantage that, so far as the rated capacity of thyristors matches the magnitude of the required driving current of a dc motor used, highly efficient ac-to-dc conversion as well as smooth and highly efficient control of the magnitude and the polarity reversing of the applied voltage can be ensured by using a thyristor full-wave rectifier bridge circuit.

The remarkable advantages obtainable by incorporating the protecting control circuit of this invention in a dc motor driving apparatus including a full-wave rectifier bridge circuit are summarized as follows.

(1) It is possible to prevent a short-circuit mode from being caused by the firing of malfunctioning thyristors.

(2) The use of a full-wave rectifier bridge system, of course, makes it possible to raise the ac-to-dc conversion efficiency as compared with a half-wave rectifier bridge system.

(3) The response of reversing, braking, stopping and other speed changing operations, that is, the controllability of a dc motor to be driven can be improved.

(4) A stable low speed operation of a dc motor to be driven can be ensured.

(5) It is possible to apply a uniform driving force to a dc motor to be driven with a result that the generation of a buzzing noise can be prevented and a sound caused by the rotation of the motor can be reduced.

We claim:

1. A dc motor driving apparatus comprising:
   a full-wave rectifier bridge circuit comprising thyristors for converting ac power to dc power;
   a dc motor forward rotation control signal supply circuit;
   a dc motor backward rotation control signal supply circuit;
   a dc motor driving control circuit, responsive to said forward and backward control signal supply circuits, for controlling said thyristors; and
   a protecting control circuit operatively associated with said dc motor driving control circuit for preventing the occurrence of a short-circuit mode in said bridge circuit caused by a malfunction of said thyristors and enabling stable driving control of said dc motor, said protecting control circuit comprising:
   a first and a second comparator respectively supplied with a dc motor forward rotation control signal from said supply circuit thereof and a dc motor backward rotation control signal from said supply circuit thereof, each thereof generating an output signal when the level of said signal supplied thereto is higher than a predetermined reference voltage, and
   a first and a second inhibit circuit each thereof supplied with the output signals of said comparators and respectively responsive to a signal indicative of a positive half cycle of an ac supply voltage and a signal indicative of a negative half cycle of the ac supply voltage, each thereof generating an output signal for disabling either one of said dc motor forward rotation control signal supply circuit and said dc motor backward rotation control signal supply circuit.

2. A dc motor driving apparatus according to claim 1, wherein each of said first and second inhibit circuits in said protecting control circuit comprises a first and a second RS flip-flop circuit, wherein one of input terminals to each of said first and second flip-flop circuits of said first inhibit circuit is responsive to said positive half cycle indicative signal and the other of said input terminals is responsive to the output signals of said first and second comparators, respectively, wherein output terminals of said first and second flip-flop circuits of said first inhibit circuit are respectively connected to a second and a first output terminal of said first inhibit circuit, wherein one of input terminals to each of said first and second flip-flop circuits of said second inhibit circuit is responsive to said negative half cycle indicative signal and the other of said input terminals is responsive to the output signals of said second and first comparators, respectively, and wherein output terminals of said first and second flip-flop circuits of said second inhibit circuit are respectively connected to a first and second output terminals of said second inhibit circuit.

* * * * *